United States Patent Office 3,291,772
Patented Dec. 13, 1966

3,291,772
SILYLAMINESILOXANES AND POLYFUNCTIONAL ACIDS FOR ENCAPSULATING COMPOSITIONS
Reginald J. Boot, Schenectady, and George P. De Zuba, Waterford, N.Y., assignors to General Electric Company, a corporation of New York
No Drawing. Filed Apr. 2, 1962, Ser. No. 184,592
10 Claims. (Cl. 260—37)

The present invention relates to novel fluid organopolysiloxane compositions convertible to the cured, solid, elastic state at room temperature, and to the process for making them. More particularly, the present invention relates to compositions comprising a mixture of a member of a class of certain reactive polyfunctional compounds and a silicon-nitrogen polymer composed of silicon-nitrogen units and silicon-oxygen units.

The fluid compositions of the present invention comprise (A) 100 parts of silicon-nitrogen polymer having a viscosity of from $10^2$ to $10^9$ centipoises at 25° C., and preferably $10^2$ to $10^5$ centipoises, said polymer containing from 0.001 to 2 moles of units selected from silylaminesiloxy $(R'_2N)R_2SiO_{0.5}$, silylaminesilazy $$(R'_2N)R_2Si(NR')_{0.5}$$

and silazy $R_3SiNR'$ chemically combined with from 98 to 99.999 moles of mixtures of units selected from $R_2SiO$, $RSiO_{1.5}$, and $SiO_2$ to provide for ratios of from 1.5 to 2.04 of the sum of the R and $R'_2N$ radicals per silicon atom of said silicon-nitrogen polymer, and (B) from 0.5 to 10 parts of a polyfunctional compound selected from boron-oxide, a boron-oxygen acid, an ester of a boron-oxygen acid, a phosphorous-containing acid, sulfuric acid and ferric chloride, where the free valences of the silicon atoms of said silicon nitrogen polymer, other than those connected to oxygen to form siloxane linkages and nitrogen to form terminal units selected from silazy, silylaminesiloxy, and silylaminesilazy, are joined to R radicals, and where the free valences of the nitrogen atoms of said silicon-nitrogen polymer, other than those connected to silicon atoms, are joined to R' radicals, where R is a member selected from monovalent hydrocarbon radicals and halogenated monovalent hydrocarbon radicals, and R' is a member selected from hydrogen and monovalent hydrocarbon radicals.

Radicals included by R as shown above are aryl radicals and halogenated aryl radicals such as phenyl, chlorophenyl, xylyl, tolyl, etc.; aralkyl radicals such as phenylethyl, benzyl, etc.; aliphatic haloaliphatic and cycloaliphatic radicals such as alkyl, alkenyl, cycloalkyl, haloalkyl including methyl, propyl, chlorobutyl, cyclohexyl, etc.; radicals included by R' as shown above include hydrogen and all the monovalent hydrocarbon radicals as shown above; R and R' separately can be all the same radical or any two or more of the aforementioned radicals included by R and R', while R is preferably methyl, and R' is preferably hydrogen.

The silicon-nitrogen polymers utilized in the preparation of the deformable compositions of the present invention can be made by reacting at a temperature in the range of 0° C. to 60° C., a halogen chain-stopped polydiorganosiloxane having the formula (1) 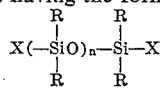

and a nitrogen compound having the formula (2)  $H—N(R')_2$ where R, and R' are as defined above, X is a halogen radical, and n is equal to from 5 to about 200, and preferably 5 to 20, inclusive. The product of reaction of Formulas 1 and 2 can be equilibrated in accordance with conventional procedures, with organopolysiloxanes such as octamethylcyclotetrasiloxane and hexamethyldisiloxane. Additional methods for making some of the silicon-nitrogen polymers containing silyl amine units and silazane units that can be employed in the practice of the invention are shown by Patents 2,676,163, Spier, and 2,503,919, Patnode.

Included among the polyfunctional compounds that are operable in the invention are boron-oxygen compounds, preferably boron-oxides such as $B_2O_3$, $B_2O_2$, $B_4O_5$, etc. In addition, other boron-oxygen compounds such as acids and esters can be employed having the formula (3) 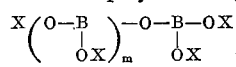

and cyclic organo borates (4)  $(ROBO)_y$ where m is a whole number equal to from 0 to 3, y is an integer equal to from 3 to 5, and X is a member selected from the class of hydrogen and R radicals, where R radicals are defined above.

Boron-oxygen compounds included by Formulae 3 and 4 are boric acids such as $H_4B_2O_4$, $H_2B_4O_6$, $H_3BO_3$, $H_2B_4O_7$, $HBO_2$, etc. and esters of boric acid, e.g., alkyl borates such as methyl, ethyl, propyl, isopropyl, butyl, isobutyl, amyl, hexyl, heptyl, etc. borates; aryl borates, e.g., phenyl, tolyl, xylyl, naphthyl, etc. borates; substituted ortho-borates, e.g., diethyl phenyl borate, diisobutyl m-tolyl borate; cyclic organo borates such as trimethoxy-boroxene, etc.

The phosphorous-containing acids that can be employed in the practice of the invention to produce the fluid compositions of the present invention are preferably, m-phosphoric acid, O-phosphoric acid, O-phosphorous acid, and pyrophosphoric acid. In addition, other phosphorous-containing acids such as pyrophosphonic acid, phosphonic acid, phenylphosphonic acid, etc. can also be satisfactorily employed. In addition to the aforementioned phosphorous-containing acids, sulfuric acid and ferric chloride are also operable in the present invention to make the deformable compositions. Weight proportions recited above with respect to the use of any acids in the practice of the invention are based on the weight of these acids in their anhydrous state.

The fluid compositions of the present invention are curable at room temperature to the solid, elastic state and can be employed in a variety of applications such as taught in Berridge Patent 2,843,555. For example, the fluid compositions of the present invention can be employed as sealers for joints between adjacent sections of highways, insulation material for electrical components by encapsulating the component, gasket materials, shock absorbers, and various other applications.

The halogen chain-stopped polydiorganosiloxanes of Formula 1 can be made by conventional procedures such as the controlled hydrolysis of a diorganodihalosilane, for example, dimethyldichlorosilane as taught in Patnode Patent 2,381,366 and Hyde Patents 2,629,726 and 2,902,-507. Another procedure that can be employed involves equilibrating a mixture of a diorganodichlorosilane and a cyclic polydiorganosiloxane in the presence of a metal catalyst such as ferric chloride as shown in Sauer Patent 2,421,653. Although the various procedures utilized in forming the halogenated polysiloxane are not critical, generally it has been found desirable to maintain the halogen content of the resulting halogen chain-stopped polysiloxane in the range of about 0.4 to about 35 percent, by weight, and preferably from about 1 to about 5 percent, by weight, of said halogen chain-stopped polysiloxane. The halogen chain-stopped polysiloxane is preferably in the form of a chlorine chain-stopped polydimethylsiloxane.

The nitrogen-containing compound shown by Formula 2 is preferably ammonia. However, various amines such as methyl amine, aniline, dimethyl amine, N-ethylaniline, methylethyl amine, etc. can also be employed, if desired.

In forming the fluid room temperature curable compositions of the present invention, the polyfunctional compound is uniformly mixed with the silicon-nitrogen polymer. Depending upon such factors as the mole percent of the silicon-nitrogen units in the silicon-nitrogen polymers and the weight of polyfunctional compound utilized, the pot life of the fluid mixture can vary widely. Experience has shown for example, that a room temperature cure of the fluid mixture can be effected in a few minutes or less to a day or more. It has been found moreover, that considerably longer pot life of the curable fluid mixture can be achieved, such as several weeks or more, if it is maintained at a temperature between about −50° C. to 0° C. Various pigments and fillers such as lamp black, titanium dioxide, etc. also can be incorporated into the fluid composition, if desired, in proportions of from about 10 percent to as high as 200 percent by weight based on the weight of the mixture of the filler and the fluid composition.

In order that those skilled in the art will be better able to practice the invention the following examples are given by way of illustration and not by way of limitation. All parts are by weight.

Example 1

A fluid composition of the present invention was prepared by forming a mixture of 1/10 part of boric acid and 2 parts of a silicon-nitrogen polymer having a viscosity of 200 centipoises at 25° C. and containing about 1.6 moles of terminal

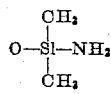

units, and about 98.4 moles of intercondensed

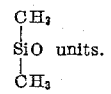 units.

The silicon-nitrogen polymer was prepared by reacting ammonia with a halogen chain-stopped polydimethylsiloxane prepared as follows:

Into a vessel containing 800 parts of dimethyldichlorosilane, there was added over a 2 hour period, a mixture of 100 parts of water and 206 parts of dioxane. The resulting mixture was heated to a general reflux with stirring until it had become homogeneous. The mixture was stripped, in vacuo, at a pot temperature of 202° C. at 12 millimeters pressure. The stripped hydrolyzate was then filtered to yield 323 parts of a clear oil containing 4.9 percent hydrolyzable chlorine.

The above prepared halogen chain-stopped polydimethylsiloxane was added into an equal volume of toluene to which dry ammonia gas had been bubbled for a period of 15 minutes. While the halogen chain-stopped polydimethylsiloxane was being slowly added to the ammoniacal toluene solution, additional ammonia was bubbled through the resulting mixture. After 30 minutes, the addition of the halogen chain-stopped polydimethylsiloxane was completed, and a further amount of ammonia was bubbled through the mixture for an additional 30 minutes to insure the presence of a satisfactory excess of ammonia. The ammonium chloride which formed during the addition, was filtered from the mixture. The toluene was removed from the resulting silicon-nitrogen polymer by passing an inert gas through the mixture. It was calculated by infrared that the resulting silicon-nitrogen polymer which had a viscosity of about 200 centipoises at 25° C. contained about 1.6 moles percent of

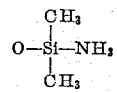

units based on the total mole of

units, and

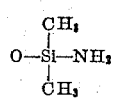

units.

The liquid mixture made from 1/10 part of boric acid and 2 parts of the above prepared silicon-nitrogen polymer, gelled within 24 hours to an elastomeric gel which was insoluble in toluene.

A thousand ohm resistor is immersed into a fluid mixture of boric acid and the silicon-nitrogen polymer as described above. It is found that in less than a day's time, the fluid mixture cures and the resistor is encapsulated.

Example 2

A fluid composition is made from 100 parts of a silicon-nitrogen polymer having a viscosity of 10,000,000 centipoises at 25° C., 40 parts of lamp black and 3 parts of boric acid.

The silicon-nitrogen polymer in the form of an uncured gum is made by equilibrating 100 parts of octamethylcyclotetrasiloxane with 0.5 part of tetramethyltetravinylcyclotetrasiloxane and 0.5 part of the silicon-nitrogen oil of Example 1. The equilibration reaction is catalyzed by 10 parts per million of KOH carried out at 160° C. for 4 hours under an atmospheric dry nitrogen. One hundred parts of the resulting polymer having a viscosity of about 10,000,000 centipoises at 25° C. is mixed on a rubber mill with about 40 parts of lamp black and about 3 parts of boric acid. The resulting mixture is extruded onto a copper wire. It is found that the mixture cures at room temperature after about a day, to a tough resilient elastomeric coating.

Example 3

A mixture was made of 1/10 part of 85 percent O-phosphoric acid and 2 parts of the above prepared silicon-nitrogen polymer of Example 1. Within 63 seconds, the mixture which had an initial viscosity of about 200 centipoises at 25° C., gelled to form an elastomeric material which was insoluble in toluene.

A thousand ohm resistor is immersed into a fluid mixture consisting of O-phosphoric acid and the silicon-nitrogen oil of Example 1. It is found that in less than a minute's time, the fluid mixture cures and the resistor is encapsulated.

Example 4

To 100 parts of a silicon-nitrogen oil prepared in accordance with the procedure of Example 1 having a viscosity of about 200 centipoises at 25° C., and about 1.6 mole percent of terminal $(NH_2)(CH_3)_2SiO_{0.5}$ units there was added about 0.2 part of concentrated sulphuric acid having a concentration of at least 98 percent hydrogen sulphate. An immediate reaction was perceptible and within a little over a minute's time, the mixture had cured to a tough elastomeric gel. One skilled in the art would know that the fluid mixture prior to cure would be suitable as an encapsulating material for electronic components.

Example 5

The procedure of Example 4 was repeated except that there was added about 0.2 part of crystalline ferric chloride in the form of a hexahydrate. The fluid mixture was allowed to remain undisturbed for a period of about 24 hours before it cured into a tough elastomeric gel.

The above examples clearly show the unexpected and valuable results achieved by the practice of the present invention. The fluid room temperature curable compositions of the present invention can additionally be employed as surface coverings for appliances, as insulation, as coatings for rods and wires, as bonding material for parts and laminates, and as adhesive formulations, etc.

While the foregoing examples have of necessity been limited to only a few of the very many variables within the scope of the present invention, it should be understood that the present invention covers a broad class of fluid compositions formed by mixing together the silicon-nitrogen polymer having intercondensed siloxane units and terminal units, silazy and silylamine siloxane units and a reactive polyfunctional compound within the scope of the present invention.

What we claim as new and desire to secure by Letters Patent of the United States is:

1. A fluid composition comprising (A) 100 parts of a silicon-nitrogen polymer having a viscosity of from $10^2$ to $10^9$ centipoises at 25° C., and from 0.001 to 2 moles of a unit selected from the class consisting of $(R'_2N)R_2SiO_{0.5}$, $(R'_2N)R_2Si(NR')_{0.5}$ and $R_3SiNR'$ chemically combined with from 98 to 99.999 moles of units selected from the class consisting of $R_2SiO$, $RSiO_{1.5}$, $SiO_2$, and mixtures thereof to provide for a ratio of from 1.5 to 2.04 of the sum of the R and $R'_2N$ radicals per silicon atom of said silicon-nitrogen polymer, and (B) from 0.5 to 10 parts of a polyfunctional compound selected from the class consisting of boron-oxide, a boron-oxygen acid, an ester of a boron-oxygen acid, a phosphorous-containing acid, sulfuric acid and ferric chloride, where the free valence of the silicon atoms of said silicon-polymer, other than those connected to oxygen to form siloxane linkages and nitrogen to form terminal units selected from the class consisting of silazy, silylaminesiloxy, and silylaminesilazy, are joined to R radicals, and where the free valences of the nitrogen atoms of said silicon-nitrogen polymer, other than those connected to silicon atoms, are joined to R' radicals, where R is a member selected from the class consisting of monovalent hydrocarbon radicals and halogenated monovalent hydrocarbon radicals, and R' is a member selected from the class consisting of hydrogen and monovalent hydrocarbon radicals.

2. A fluid composition in accordance with claim 1, where the polyfunctional compound is boron-oxide.

3. A fluid composition in accordance with claim 1, where the polyfunctional compound is a boron-oxygen acid.

4. A fluid composition in accordance with claim 1, where the polyfunctional compound is an ester of a boron-oxygen acid.

5. A fluid composition in accordance with claim 1, where the polyfunctional compounds is a phosphorous-containing acid.

6. A fluid composition in accordance with claim 1, where the polyfunctional compound is sulfuric acid.

7. A fluid composition in accordance with claim 1, where the polyfunctional compound is ferric chloride.

8. A fluid composition comprising (A) 100 parts of a silicon-nitrogen polymer having a viscosity of from 100 to 100,000 centipoises at 25° C. and from 0.001 to 2 moles of units selected from the class consisting of silylaminedimethylsiloxy, silylaminedimethylsilazy, and trimethylsilazy chemically combined with from 98 to 99.999 moles of units selected from the class consisting of dimethylsiloxy, methylsiloxy and tetrasiloxy and mixtures thereof to provide for a ratio of from 1.5 to 2.04 of the sum of the methyl and silylamine radicals per silicon atom of said silicon-nitrogen polymer, and (B) from 0.5 to 10 parts based on the weight of (A) of O-phosphoric acid.

9. A fluid composition comprising (A) a silicon-nitrogen polymer having a viscosity of from $10^2$ to $10^9$ centipoises at 25° C., and from 0.001 to 2 moles of units selected from the class consisting of $(R'_2N)R_2SiO_{0.5}$, $(R'_2N)R_2Si(NR')_{0.5}$ and $R_3SiNR'$ chemically combined with 98 to 99.999 moles of units selected from the class consisting of $R_2SiO$, $RSiO_{1.5}$, $SiO_2$, and mixtures thereof to provide for a ratio of from 1.5 to 2.04 of the sum of R and $R'_2N$ radicals per silicon atom of said silicon-nitrogen polymer, (B) from 0.5 to 10 parts by weight, based on the weight of (A) of a polyfunctional compound selected from the class consisting of boron-oxide, boron-oxygen acid, an ester of a boron-oxygen acid, a phosphorous-containing acid, sulfuric acid and ferric chloride and (C) from 10 percent to 200 percent by weight, based on the weight of (A) and (B) of a filler selected from the class consisting of lamp black, and titanium dioxide, where the free valences of the silicon atoms of said silicon-nitrogen polymer, other than those connected to oxygen to form siloxane linkages and nitrogen to form terminal units selected from the class consisting of silazy, silylaminesiloxy, and silylaminesilazy, are joined to R radicals, and where the free valences of the nitrogen atoms of said silicon-nitrogen polymer, other than those connected to silicon atoms, are joined to R' radicals, where R is a member selected from the class consisting of monovalent hydrocarbon radicals and halogenated monovalent hydrocarbon radicals, and R' is a member selected from the class consisting of hydrogen and monovalent hydrocarbon radicals.

10. A process for making a fluid composition convertible to the cured, solid, elastic state at room temperature comprising mixing together (A) 100 parts of a silicon-nitrogen polymer having a viscosity of from $10^2$ to $10^9$ centipoises at 25° C., and from 0.001 to 2 moles of units selected from the class consisting of $(R'_2N)R_2SiO_{0.5}$, $(R'_2N)R_2Si(NR')_{0.5}$ and $R_3SiNR'$ chemically combined with from 98 to 99.999 moles of units selected from the class consisting of $R_2SiO$, $RSiO_{1.5}$, $SiO_2$, and mixtures thereof, to provide for a ratio of from 1.5 to 2.04 of the sum of the R and $R'_2N$ radicals per silicon atom of said silicon-nitrogen polymer, and (B) from 0.5 to 10 parts by weight, based on the weight of (A) of a polyfunctional compound selected from the class consisting of boron-oxide, a boron-oxygen acid, an ester of a boron-oxygen acid, a phosphorous-containing acid, sulfuric acid and ferric chloride, where the free valences of the silicon atoms of said silicon-nitrogen polymer, other than those connected to oxygen to form siloxane linkages and nitrogen to form terminal units selected from the class consisting of silazy, silylaminesiloxy, and silylaminesilazy, are joined to R radicals, and where the free valences of the nitrogen atoms of said silicon-nitrogen polymer, other than those connected to silicon atoms, are joined to R' radicals, where R is a member selected from the class consisting of monovalent hydrocarbon radicals and halogenated monovalent hydrocarbon radicals, and R' is a member selected from the class consisting of hydrogen and monovalent hydrocarbon radicals.

References Cited by the Examiner

UNITED STATES PATENTS

| | | | |
|---|---|---|---|
| 2,676,163 | 4/1954 | Speier | 260—448.2 |
| 2,857,356 | 10/1958 | Goodwin | 260—46.5 |
| 2,865,918 | 12/1958 | Hurwitz et al. | 260—448.2 |
| 2,876,209 | 3/1959 | De Benneville et al. | 260—448.2 |
| 3,047,535 | 7/1962 | Evans et al. | 260—46.5 |

MORRIS LIEBMAN, *Primary Examiner.*

J. E. CALLAGHAN, *Assistant Examiner.*